Figure 1:
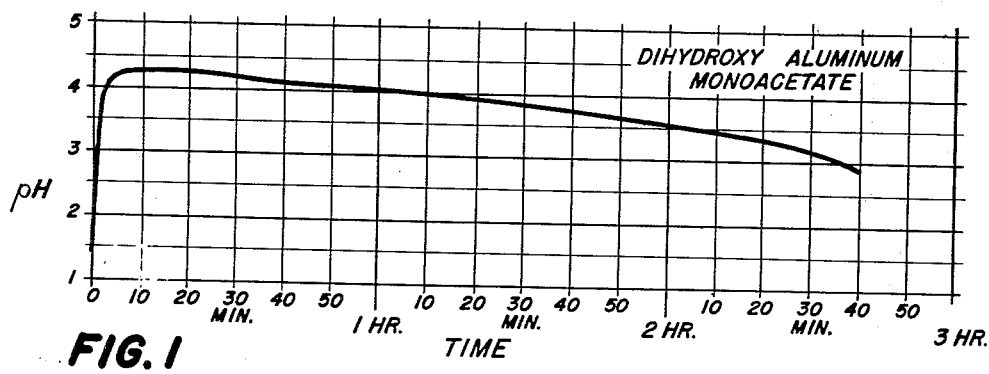

June 14, 1960

R. C. DENISON 2,940,898

ALUMINUM SALT ANTACID COMPOSITIONS
AND METHOD OF USING SAME
Filed March 13, 1958

INVENTOR.
Ruth C. Denison
BY
Mason, Kolehmainen, Rathburn, and Wyss,
ATTORNEYS

United States Patent Office 2,940,898
Patented June 14, 1960

2,940,898
ALUMINUM SALT ANTACID COMPOSITIONS AND METHOD OF USING SAME

Ruth C. Denison, Signal Mountain, Tenn., assignor to Mrs. John W. Bradley, Lookout Mountain, Tenn.

Filed Mar. 13, 1958, Ser. No. 721,189

4 Claims. (Cl. 167—55)

This invention relates to antacids and the production thereof. More particularly it relates to antacid compositions containing dihydroxy aluminum salts of aliphatic acids and to methods for the production thereof, as well as the use of dihydroxy aluminum salts of aliphatic acids as antacids for medicinal purposes. Specifically the invention relates to dihydroxy aluminum alkanoates for use as medicinal agents for the relief of excess gastric acidity.

Gastric antacids are substances which lower the acidity of stomach fluids when ingested. Their primary object is to raise the pH of the gastric juices above the so-called "pain threshold" of pH 3.0 to a value in the range of 3.0 to 4.2. It is important that antacids should not reduce acidity of the stomach to an extent that will bring about an increase of gastric secretion, the so-called "acid rebound" which takes place at pH of 7 to 8, or reduce the acidity to a point where normal digestion is adversely affected. The removal of acids from gastric juices may take place by actual chemical neutralization or by temporary absorption of the acids by the antacids or by a combination of the two methods.

Antacids may be divided into two groups, the so-called systemic and non-systemic antacids. The systemic antacids actually neutralize the acid in non-recoverable form so that continued use of such antacids can upset the acid-base balance of the body. If, in addition, the systemic antacid is soluble and readily absorbed into the blood stream, such as sodium bicarbonate, further systemic electrolyte disturbances can be caused leading to definite alkalosis. Insoluble systemic antacids, such as calcium carbonate or magnesium trisilicate, are less dangerous than the soluble type when excesses are used. Non-systemic antacids, on the other hand, do not produce any final effect on the acid-base balance of the body since they preferably simply bind the acid in the stomach either by adsorption or chemical combination and then release this acid on passage through the alkaline area of the small intestine. Certain non-systemic antacids, such as kaolin or the ion exchange resins, suffer from the further disadvantage that they must be used in rather large quantities and may cause fecal impaction.

The buffer type of non-systemic antacids, is, therefore, preferred in medical practice, and the best known example of this type is aluminum hydroxide. A non-systemic antacid, such as aluminum hydroxide, even when used in very large excess will not raise the pH of the stomach juice much above pH 4.2 so there is no danger of "acid rebound." Aluminum hydroxide reacts with the hydrochloric acid of the stomach to form mixtures of aluminum chlorohydrates. After passage into the intestine the alkaline juices then hydrolyze off the chloride from the aluminum chlorohydrates and again reprecipitate aluminum hydroxide so that there is no permanent change in the acid-base balance of the body, the aluminum hydroxide simply picking up the acid from the stomach and returning it to the intestine.

Aluminum hydroxide is not an ideal antacid, however. Continued use of this substance in large amounts may lead to constipation and to excessive removal of phosphates from the intestinal tract by formation of the highly insoluble aluminum phosphate. In addition, although aluminum hydroxide in the form of the magma or gel shows both rapid and prolonged neutralization of gastric juices, this is not true when the dried preparations are used in tablet or powder form, especially if the powder or tablets have undergone a period of aging. On standing the dried aluminum hydroxide gel slowly changes to a complex of hydrated alumina which is highly insoluble and reacts very slowly with dilute hydrochloric or other acid. For this reason so-called aluminum hydroxide in powder or tablet form is not a very prompt or effective antacid and when used as such is frequently fortified for prompt action by the addition of systemic or other types of antacids.

It is desirable that antacids be prepared which have all of the advantages of aluminum hydroxide and avoid its disadvantages. More specifically, it is desirable that antacids be available which promptly raise the pH of gastric juices to values in the range of 3.0 to 4.2 and maintain the pH values in that range for extended periods of time in excess of 2 hours. Such antacids should be stable on long standing and should not lead to insoluble or slow-acting materials as does aluminum hydroxide. Furthermore, the substances should be non-systemic, essentially non-toxic and should not result in acid rebound. They should be effective in relatively small dosages and capable of neutralizing substantial quantities of dilute acid. In addition, such antacids should be devoid of taste, stable under ordinary conditions of packing and transportation and storage, and should be available from readily obtained chemicals.

It is an object of this invention to provide antacids of the type described above. It is a further object of this invention to provide simple and efficient methods of producing such antacids from readily available materials. It is a further object of this invention to provide antacids having advantages over antacid materials previously known. A further object is to provide a safe, rapid and efficient method of reducing gastric hyperacidity by administration of dihydroxy aluminum salts of aliphatic acids in appropriate dosage. Another object is to provide continuous medication in cases of hyperacidity and for peptic ulcer therapy. These and other objects will be apparent from and are achieved in accordance with the following disclosure taken in conjunction with the attached drawing forming a part hereof.

Figure 2:
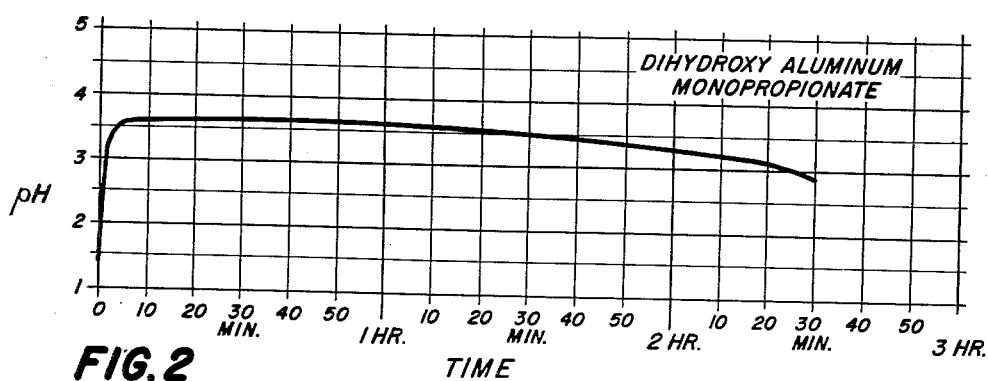
Figure 3:
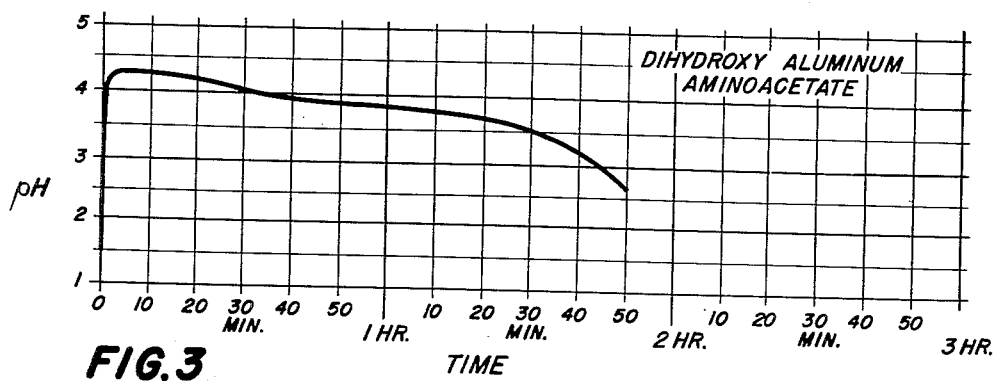

The attached single-sheet drawing shows the pH curves of stomach juices when admixed with antacids produced in accordance with this invention, the pH of the stomach juice being plotted against time. As is apparent from Figs. 1 and 2, the antacids of this invention rapidly raise the pH value of gastric juices above the pain threshold of 3.0 and maintain it in the range of pH 3.0 to 4.2 for extended periods of time. Fig. 3 shows comparative results with an established antacid, dihydroxy aluminum aminoacetate.

The antacids produced in accordance with this invention are dihydroxy aluminum salts of aliphatic acids having the following general formula:

$$(HO)_2Al-O-CO-R$$

where the radical R is an aliphatic hydrocarbon radical. The R—CO—radical is an acyl radical derived from an acid of the fatty acid series and preferably from the lower alkanoic acids containing 2 to 6 carbon atoms. For instance, R may represent methyl, wherein the antacid is dihydroxy aluminum monoacetate. R may also represent ethyl, propyl and butyl, wherein the antacid is dihydroxy aluminum monopropionate, monobutyrate and monovalerate, respectively.

The dihydroxy aluminum salts of aliphatic acids of the foregoing type are effective in dosage unit form as antacid agents for the counteraction of gastric hyperacidity and treatment of peptic ulcer. These preparations are buffer-type non-systematic antacids in that the acid removed from the gastric juice is readily absorbed from the small intestine, thus avoiding disturbance of the acid-base balance and the possibility of alkalosis. The preparations are essentially tasteless and are stable in a dried state for extended periods of time. These antacid preparations are both very rapid and long-acting against gastric acidity. They do not produce undesirable gas as do sodium bicarbonate and other carbonate-containing antacid preparations.

One mole of the antacid ingredient can counteract three moles of gastric acid, such as hydrochloric acid. The dihydroxy aluminum salts of aliphatic acids apparently react with hydrochloric acid by replacing the hydroxyl groups as well as the acetate radical on the aluminum with chloride ions. As in the case of aluminum hydroxide, the acids so combined can then again be released in the intestines. In contrast to dried aluminum hydroxide the antacid preparations of this invention show no tendency in the dried state to change their acid-neutralizing properties, either as to speed or amount of acid neutralized. They can be formulated with conventional excipients such as sugar, starch, dextrins and other binders into tablets which disintegrate readily when ingested and which retain prompt and prolonged neutralization properties after years of storage. They can be administered to adults in the form of tablets or magma in dosages of 4 to 15 grains and to children in dosages of 1 to 5 grains.

The antacid preparations of this invention can be used as buffering agents for other drugs, such as antibiotics, anticholinergics, analgesics and antirheumatics. They are particularly useful as buffering agents for theophylline and related xanthines. They can also be used as carriers for atropine and belladonna alkaloids, preferably in dosages of 1 to 5 grains of dihydroxy aluminum alkanoate per unit dosage of drug. Similarly, they can be used as buffering agents for pharmaceutical creams and ointments to be applied to the skin, such as those containing penicillin or other antibiotic, topical anesthetics, antihistamines and analgesics.

Because the antacid preparations of this invention are more effective than aluminum hydroxide, lower dosages can be used and the amount of aluminum ingested is less. Therefore, they exhibit a much lower constipating effect than do conventional antacids, such as aluminum hydroxide gel, and they do not tend to produce diarrhea. There is no evidence that they interfere with normal digestive processes or irritate the stomach. They can be combined with other medicaments, such as atropine, the belladonna alkaloids or barbiturates, either in liquid or tablet form, which combinations cannot be satisfactorily produced with aluminum hydroxide. Furthermore, these antacid preparations do not absorb or interfere with the action of anticholinergic drugs, thus permitting the simultaneous administration of both antacid and anticholinergic drugs.

The dihydroxy aluminum salts of aliphatic acids can be readily prepared by reacting an aluminum alcoholate with an aqueous solution containing an equivalent quantity or a slight excess (e.g., 10%) of an aliphatic acid. The reaction can be run at room temperature (e.g., 20° C.) or at higher temperatures up to about 95° C. Both the acid solution and the aluminum alcoholate can be at their boiling points at the start of the reaction. The aluminum alcoholate can be used in solid form or it can be melted; it can be used in solution in an alcohol. The concentration of the aqueous solution of aliphatic acid can be varied rather widely, but the preferred concentration is one which contains 2 to 5 times the amount of water theoretically necessary for the hydrolysis of the alcoholate. The acid is preferably a water-soluble aliphatic acid, such as acetic, propionic or butyric. The aluminum alcoholate may be any of the compounds of the following general formula $$Al(OC_nH_{2n+1})_3$$

wherein $n$ is a whole number from 1 to 5. Preferred is aluminum isopropoxide which is readily available, although other aluminum alkoxides, such as aluminum ethoxide and aluminum methoxide, may likewise be used.

The antacid products of this invention have excellent buffering capacity with very rapid and prolonged antacid action. In Table I below are given comparative data illustrating the buffering action of the antacids of this invention and those of the prior art. In these experiments 2 grams of antacid were added to 150 ml. of acidic gastric juice and the pH of the mixture plotted against time, according to the general method of Holbert, Noble and Grote, Journal of The American Pharmaceutical Association, Scientific Edition, volume 37, pages 292, et. seq. (1948). The gastric juice was strongly acid, having an initial pH of 1.40, and the juice was maintained at room temperature (e.g., 22° C.) throughout the measurements. It is seen that the dihydroxy aluminum monoacetate and dihydroxy aluminum monopropionate raise the pH of the gastric juice to above 3.0 rapidly and maintain it in the range of from 3.0 to about 4.2 for periods longer than 2 hours. These results compare very favorably with dihydroxy aluminum aminoacetate and dihydroxy aluminum sodium carbonate which are well known antacids in clinical use. Dihydroxy aluminum monoacetate and dihydroxy aluminum monopropionate are more effective than aluminum hydroxide in the same test, because with the latter the pH of the gastric juice falls to below 3.0 in less than 1 hour. In further comparison under the same conditions, dihydroxy aluminum aminoacetate maintained the pH of the gastric solution above 3.0 for a period of less than 2 hours, in contrast to the compounds of this invention which maintained it for more than 2 hours.

Table I also gives data on a mixture of 2 parts of aluminum hydroxide and 1 part of aluminum acetate under the same test conditions. It is seen that the mixture is different from dihydroxy aluminum acetate and is not an effective antacid.

TABLE NO. I

| Time | Dihydroxy Aluminum Monoacetate | 2 Al(OH)₃+ 1 Al(OAc)₃ | Dihydroxy Aluminum Monopropionate | Dihydroxy Aluminum Aminoacetate |
|---|---|---|---|---|
| Start | 1.40 | 1.40 | 1.40 | 1.40 |
| 15 Sec | 1.76 | 1.50 | 1.45 | 2.73 |
| 1 Min | 3.50 | 1.62 | 2.00 | 4.20 |
| 2 Min | 3.72 | 1.78 | 2.85 | 4.25 |
| 5 Min | 4.14 | 2.45 | 3.49 | 4.28 |
| 10 Min | 4.23 | 3.45 | 3.57 | 4.29 |
| 20 Min | 4.23 | 3.47 | 3.57 | 4.18 |
| 30 Min | 4.17 | 3.49 | 3.59 | 4.05 |
| 40 Min | 4.13 | 3.44 | 3.60 | 3.92 |
| 50 Min | 4.10 | 3.40 | 3.60 | 3.87 |
| 1 Hr | 4.02 | 3.32 | 3.59 | 3.82 |
| 1 Hr. 10 Min | 3.98 | 3.10 | 3.56 | 3.76 |
| 1 Hr. 20 Min | 3.92 | 2.68 | 3.52 | 3.66 |
| 1 Hr. 30 Min | 3.82 | | 3.45 | 3.47 |
| 1 Hr. 40 Min | 3.74 | | 3.38 | 3.15 |
| 1 Hr. 50 Min | 3.65 | | 3.30 | 2.62 |
| 2 Hrs | 3.55 | | 3.20 | |
| 2 Hrs. 10 Min | 3.44 | | 3.13 | |
| 2 Hrs. 20 Min | 3.32 | | 3.07 | |
| 2 Hrs. 30 Min | 3.18 | | 2.85 | |
| 2 Hrs. 40 Min | 2.82 | | | |

Fig. 1 of the drawing is a graph showing the data in column 1 of Table I illustrating how dihydroxy aluminum monoacetate maintains the pH of the gastric juice in the range of 3.0 to 4.2 for extended periods of time. Likewise, Fig. 2 represents similar values for dihydroxy aluminum monopropionate which maintains the pH of gastric juice in the range of 3.0 to 3.6 for extended periods of time. Fig. 3 gives comparative data for dihydroxy aluminum aminoacetate under comparable test conditions and illustrates the fact that the pH falls more rapidly to below the pain threshold.

The acid consuming power of the antacids of this invention was demonstrated by adding 0.25 gram of the powdered antacid material to 75 ml. of 0.100 N hydrochloric acid solution. The solution was gently agitated for 10 minutes and then back titrated with 0.1 N sodium hydroxide solution to a pH of 3.8. The acid consuming power is expressed as milliliters of 0.100 N hydrochloric acid consumed by a gram of the sample. Comparative data for antacids are given in Table II.

TABLE NO. II

| Antacid | Acid Consuming Power |
|---|---|
| Dihydroxy aluminum aminoacetate | 162.0 |
| Dihydroxy aluminum monoacetate | 134.6 |
| Dihydroxy aluminum monopropionate | 131.6 |

The pH of aqueous suspensions of antacids are given in Table III.

TABLE NO. III

| Antacid | pH |
|---|---|
| Dihydroxy aluminum monoacetate | 4.55 |
| Mixture (2 Al(OH)$_3$+1 Al (OAc)$_3$) | 4.75 |
| Dihydroxy aluminum aminoacetate | 7.48 |
| Dihydroxy aluminum monopropionate | 4.50 |

The invention is further disclosed by the following examples which are provided for purposes of illustration only. It will be appreciated by those skilled in the art that numerous modifications in materials, times, temperatures, concentrations and equivalent substances may be made without departing from the invention.

*Example 1*

204 parts of finely powdered aluminum isopropoxide are added with vigorous stirring to a solution of 60 parts of acetic acid dissolved in 108 parts of water at room temperature. Much heat is developed immediately and the material forms a gelatinous rubbery mass during the stirring. Much of the released isopropanol is evaporated during this process. The product is then air-dried, preferably at a temperature not over 40° C. The product may then be washed with ethanol to remove any excess of acetic acid. The yield of dihydroxy aluminum monoacetate is practically quantitative. The product is a white powder which is nearly odorless and tasteless.

*Example 2*

204 parts of finely powdered aluminum isopropoxide are added with vigorous stirring to a solution of 74 parts of propionic acid in 144 parts of water. Mixing is continued until the material forms a gelatinous rubbery mass and heat is evolved, evaporating much of the isopropanol. The product is then air-dried at a temperature not greater than 40° C. The product is then washed thoroughly with absolute alcohol and dried to remove any excess acid. A quantitative yield of dihydroxy aluminum monopropionate in odorless, tasteless form is thus produced.

*Example 3*

Dihydroxy aluminum monobutyrate is produced in accordance with the method of Example 1 by using 88 parts of n-butyric or isobutyric acid in lieu of the acetic acid. The product is air-dried and washed thoroughly with absolute ethanol to remove traces of butyric acid. The product thus formed is highly satisfactory as a non-systemic antacid but may have the undesirable taste and odor of butyric acid unless all traces of this material are carefully washed out.

*Example 4*

Six-grain tablets of dihydroxy aluminum monoacetate are prepared from the following formulation:

| | Grams |
|---|---|
| Dihydroxy aluminum monoacetate | 71,500 |
| Corn starch U.S.P. (dried CMC) for slugging | 7,150 |
| Powdered sugar (XXXXXX) | 3,550 |
| Calcium citrate | 838 |
| Magnesium stearate for slugging | 1,600 |
| Pectin NF | 838 |
| Corn starch, dried (disintegrator) | 4,200 |
| Methyl salicylate U.S.P. | 10.5 |
| Oil of peppermint | 105 |
| Ethyl ether | 150 |
| Magnesium stearate for granules | 400 |

The dihydroxy aluminum acetate, corn starch for slugging, powdered sugar, methyl salicylate, oil of peppermint and ethyl ether are mixed and milled. Then the magnesium stearate for slugging is mixed in and the mixture is slugged. The preparation is granulated through a No. 8 screen and reslugged. It is then granulated through a No. 14 screen and the granules classified, those passing the No. 14 screen and remaining on a No. 40 screen being retained. The fines are reslugged and classified as above. To the finished granules are added corn starch (disintegrator), calcium citrate, pectin and magnesium stearate for granules and the product is mixed in a tumbler mixer and pressed into tablets weighing 452 milligrams each. Each tablet contains 357 milligrams (6 grains) of dihydroxy aluminum monoacetate.

In an analogous way there can be prepared 5-grain and 7½-grain tablets of dihydroxy aluminum monoacetate, dihydroxy aluminum monopropionate and dihydroxy aluminum monobutyrate.

What is claimed as new and is desired to be secured by Letters Patent of the United States is:

1. A method of reducing gastric hyperacidity which comprises administering a dihydroxy aluminum salt of a lower alkanoic acid at a dosage of 1 to 15 grains.

2. A method of reducing gastric hyperacidity which comprises administering dihydroxy aluminum monoacetate at an adult dosage of 4 to 15 grains.

3. A method of reducing gastric hyperacidity which comprises administering dihydroxy aluminum monopropionate at an adult dosage of 4 to 15 grains.

4. A solid medicinal composition, useful as a non-systemic antacid in dosage unit form, which comprises 1 to 15 grains of a dihydroxy aluminum salt of a lower alkanoic acid per dosage unit in a pharmaceutical carrier comprising a soluble carbohydrate and a binding agent.

References Cited in the file of this patent

FOREIGN PATENTS 800,405    Germany _____ July 8, 1949

OTHER REFERENCES

Chem. Abst., vol. 45, 1951, p. 827d.